United States Patent
Wagner et al.

(10) Patent No.: US 8,151,099 B2
(45) Date of Patent: Apr. 3, 2012

(54) VIRTUALIZED SERVICE TOOL AND VIRTUALIZED CONTROL TOOL

(75) Inventors: Todd M. Wagner, Washington, IL (US); John L. Traenkenschuh, Mackinaw, IL (US); Paul W. Bierdeman, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 890 days.

(21) Appl. No.: 12/216,206

(22) Filed: Jul. 1, 2008

(65) Prior Publication Data

US 2010/0005280 A1    Jan. 7, 2010

(51) Int. Cl.
*G06F 15/177* (2006.01)

(52) U.S. Cl. ............... 713/1; 713/182; 717/124

(58) Field of Classification Search ............ 713/1, 182; 717/124
See application file for complete search history.

(56) References Cited

U.S. PATENT DOCUMENTS

| | | | |
|---|---|---|---|
| 6,014,745 | A | 1/2000 | Ashe |
| 6,424,891 | B1 | 7/2002 | Sargent et al. |
| 6,757,262 | B1 | 6/2004 | Weisshaar et al. |
| 6,778,932 | B2 | 8/2004 | Struck et al. |
| 6,920,502 | B2 | 7/2005 | Araujo et al. |
| 7,127,548 | B2 | 10/2006 | Bennett et al. |
| 7,218,925 | B2 | 5/2007 | Crocker et al. |
| 7,225,333 | B2 | 5/2007 | Peinado et al. |
| 7,272,723 | B1 | 9/2007 | Abbott et al. |
| 7,359,775 | B2 | 4/2008 | Strege et al. |
| 7,650,425 | B2 * | 1/2010 | Davis et al. .......... 709/238 |
| 7,669,061 | B2 * | 2/2010 | Curt et al. .......... 713/300 |
| 2003/0046377 | A1 * | 3/2003 | Daum et al. .......... 709/223 |
| 2003/0115453 | A1 | 6/2003 | Grawrock |
| 2004/0181782 | A1 * | 9/2004 | Findeisen .......... 717/130 |
| 2007/0173993 | A1 | 7/2007 | Nielsen et al. |
| 2007/0180450 | A1 | 8/2007 | Croft et al. |
| 2007/0213897 | A1 | 9/2007 | Estes et al. |
| 2007/0271014 | A1 | 11/2007 | Breed |
| 2008/0033609 | A1 | 2/2008 | Razavi |
| 2008/0034365 | A1 | 2/2008 | Dahlstedt |

OTHER PUBLICATIONS

J. Evans, "IBM Planning Switch to Mac, IBM is evaluating a scheme to offer workers Mac or Windows Machines," Macworld UK, Apr. 17, 2008 (1 pg.) (from http://www.macworld.co.uk/mac/news/index.cfm?RSS&NewsID=21029).
Wikipedia, Virtualization, from http://en.wikipedia.org/wiki/Virtualization, Jun. 5, 2008 (5 pgs.).
Wikipedia, Windows CE, from http://en.wikipedia.org/wiki/Windows_CE, Feb. 15, 2008 (5 pgs.).
VMware, "Virtual Desktop Infrastructure," Ziff Davis Media Custom Publishing, from http://www.vmware.com/pdf/virtual_desktop_infrastructure_wp.pdf, (5 pgs.).

* cited by examiner

*Primary Examiner* — Thuan Du
(74) *Attorney, Agent, or Firm* — Finnegan, Henderson, Farabow, Garrett & Dunner LLP

(57) ABSTRACT

A computer-readable medium is disclosed. The computer-readable medium stores a virtualized service tool application program for running on a computer running an existing operating system platform. The virtualized service tool application program has operating system software configured to execute as an internal operating system platform separate from the existing operating system platform, and that is configured with settings that permit the computer to communicate with one or more machines coupled to the computer. The virtualized service tool application additionally has a service module configured to perform service-related tasks for the one or more machines coupled to the computer.

20 Claims, 4 Drawing Sheets

VIRTUALIZED SERVICE TOOL AND VIRTUALIZED CONTROL TOOL

TECHNICAL FIELD

The disclosed embodiments relate to a virtualized service tool and a virtualized control tool, and more particularly relate to a virtualized service tool for performing services on and a virtualized control tool for controlling one or more machines.

BACKGROUND

Service tools are often used to perform services on machines. For example, a service tool may be used to perform diagnostics and maintenance on a vehicle and its associated parts and/or systems, such as the engine, exhaust system, electrical system, etc. A service tool may be implemented, for example, in a computer that connects to a machine via an interface such as a CAN-1939 interface that connects to a service area network via a network interface.

Some service tools are implemented via computer application programs running on a computers such as desktop PCs, laptops, or other host computers running a host operating system (e.g., Microsoft Windows™, Linux™, Mac OS™, etc.). Certain service tools may run on the host operating system of multi-functional personal computers and may be used to perform diagnostic and maintenance services on machines. However, because these service tools run on the host operating system, they may interfere with the host operating system settings and operations, resulting in costly and time consuming configuration and maintenance of the host computer and host operating system, which service technicians may not be qualified to handle. For example, to connect a service tool running on a host operating system to a service network of a machine to be serviced, network and security settings and configurations for the host operating system may need to be adjusted. These adjustments may be difficult for a service technician to carry out, as the service technician would typically be trained in using service tools but not necessarily in computer networking applications. Consequently, altering the network and security settings of a host operating system on a PC can be complicated, can leave the PC open to attacks from malicious attacks and/or viruses, and may result in improper settings and communication failures.

To avoid such complications, some service tools are implemented on systems that are separate from a PC or laptop. For example, U.S. Patent Application Publication No. 2008/0033609 A1 to Razavi (the '609 publication) describes a data acquisition system that connects to a vehicle in order to diagnose the vehicle. The data acquisition system is separate from a laptop or PC, and may be connected to a laptop or PC via an interface device. Collected data may be viewed using the laptop or PC. While the system described by the '609 publication may avoid the need to alter configuration settings on a PC or laptop, it lacks the processing capability of a multi-functional laptop or PC. In addition, it requires a direct connection to a computer to upgrade or update the software that runs the data acquisition system. Furthermore, the system of the '609 publication requires users to maintain two separate hardware-based systems (e.g., a computer and separate data acquisition system), which can be cumbersome and which lacks the flexibility that a software-based service tool provides.

The disclosed embodiments are directed toward overcoming the shortcomings of the systems described above.

SUMMARY

In one embodiment, a computer-readable medium is disclosed. The computer-readable medium stores a virtualized service tool application program for running on a computer running an existing operating system platform. The virtualized service tool application program includes operating system software configured to execute as an internal operating system platform separate from the existing operating system platform, and that is configured with settings that permit the computer to communicate with one or more machines coupled to the computer. The virtualized service tool application further includes a service module configured to perform service-related tasks for the one or more machines coupled to the computer.

In another embodiment, a method of diagnosing one or more machines is disclosed. The method includes providing a service tool application program at a computer running an existing operating system platform. The service tool application program includes a configuration code portion that permits the service tool application program to communicate with a remote machine without changing the communication settings of the existing operating system, and a diagnostic application code portion that permits the service tool application program to run diagnostic tasks for diagnosing the remote machine. The method further includes executing the service tool application program, and performing diagnostic tasks on the remote machine using the service tool application program.

In another embodiment, a computer-readable medium is disclosed. The computer-readable medium stores a virtualized control module application program. The virtualized control module application program includes operating system software that is configured with settings that permit the computer readable medium to execute the virtualized control module application program and to communicate with a machine coupled to the computer readable medium via a communication interface, and control software configured to control a part of the machine.

DETAILED DESCRIPTION

Figure 1:
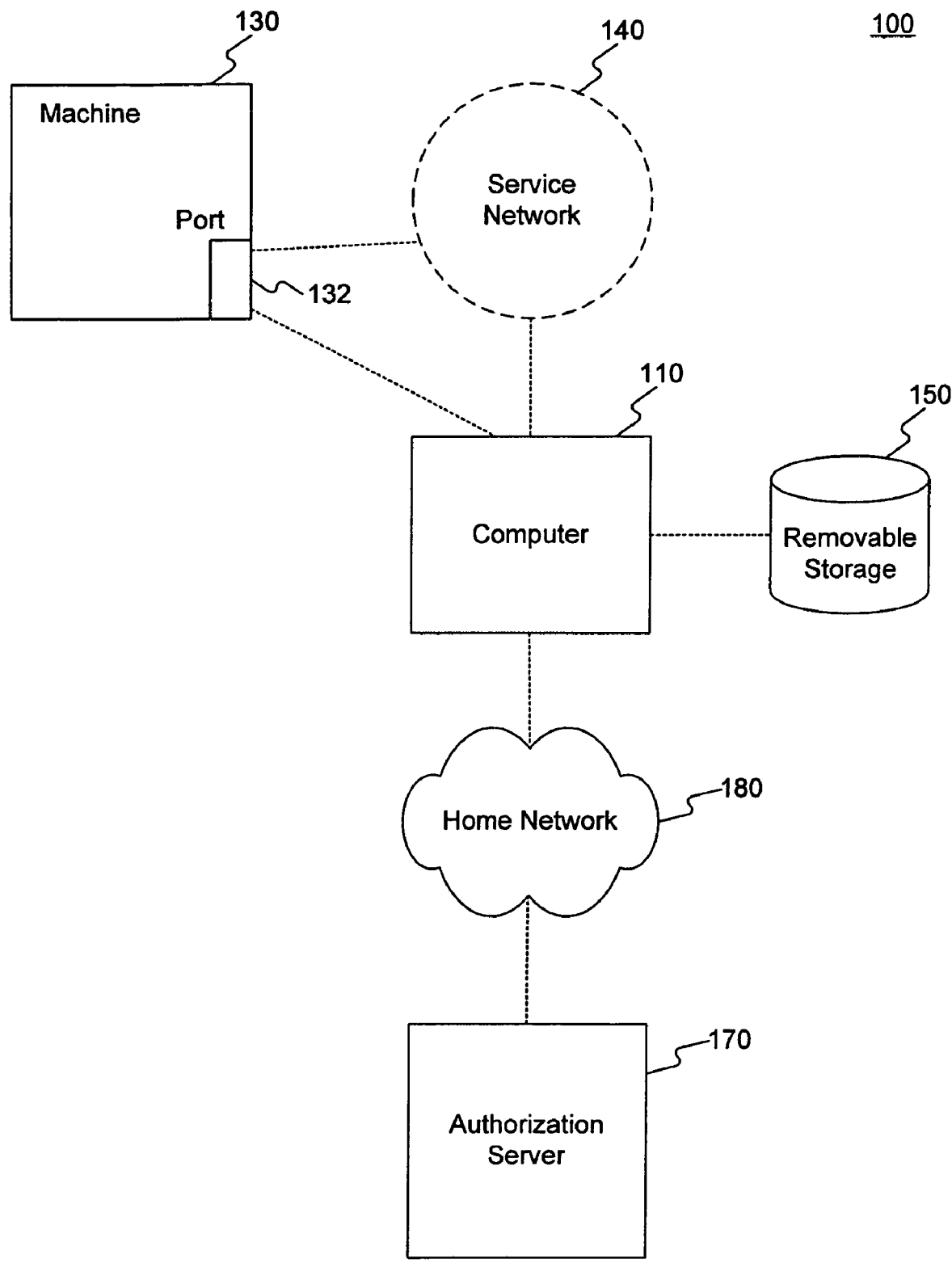
FIG. 1 illustrates an exemplary system for implementing a service tool, consistent with certain disclosed embodiments.

FIG. 1 illustrates an exemplary system 100 for implementing the disclosed service tool. In one embodiment, system 100 includes computer 110, machine 130, service network 140, removable storage 150, authorization server 170, and home network 180. Computer 110 may communicate with machine 130 through service network 140, or directly via one or more data links. Computer 110 may communicate with authorization server 170 through a home network 180, or through one or more other communication networks.

Computer 110 may be a personal computer, a laptop computer, personal digital assistant (PDA), computer workstation, cellular phone, or other processing and/or communication device. Computer 110 may include one or more processors; a computer readable media storage system including one or more memory storage devices (e.g., ROM, RAM, hard drive, etc.); one or more removable memory slots such as CD/DVD reader/writer, USB ports for flash memory, etc.; buses; i/o ports; network interfaces; and other standard computer components. Computer 110 may also be associated with one or more peripheral devices, such as, for example, a mouse, keyboard, display screen, printer, removable memory storage devices (e.g., removable flash memory, CD, DVD, etc.). In addition, computer 110 may run a host operating system 112 (shown in FIG. 2, and described further below), which handles the operation of computer hardware and hosts application programs which run on computer 110. Computer 110 may include any known additional hardware and software components typically associated with personal computers, such as, for example, audio and video hardware and software, word processing software, software and hardware for accessing the Internet or other networks, device drivers, etc.

Machine 130 may be any machine capable of being serviced by computer 110. For example, machine 130 may be a vehicle (e.g., automobile; mobile earth moving equipment such as a front loader, dump truck, etc.), an engine, or other equipment. In one embodiment, machine 130 may be a type of construction equipment (e.g., backhoe, front loader, dump truck, crane, motorgrader, steam roller, etc., or the engine or motor systems of those devices). In one embodiment, machine 130 includes a plurality of sensors and controllers (not shown) and at least one port 132, which is configured to relay information to and from machine 130. For example, port 132 may be a CAN-1939 interface, or other standard interface used in the field of machine diagnostics and maintenance.

Service network 140 is a network configured to facilitate communications between a service computer and one or more machines. For example, service network 140 may permit external computers or devices (e.g., computer 110), to access one or more machines (e.g., machine 130) to perform services on the one or more machines.

Removable storage 150 may include, for example, flash memory, CD, DVD, or other computer-readable storage media capable of being accessed (e.g., read from, erased, and/or written to) by computer 110. For example, removable storage 150 may connect to computer 110 via a USB port, a CD or DVD tray, or other communication connection (e.g., port 118, shown in FIG. 2).

Authorization server 170 is a server system that communicates with computer 110 in order to authorize use of a service tool. Authorization server 170 may be any known type of server computer system connected to a network and capable of communicating with computer 110.

Home network 180 may be any network to which computer 110 may connect and gain access to for communication purposes (e.g., to communicate with remote systems). For example, home network 180 may be a LAN, WAN, Intranet, the Internet, or other communication network.

Figure 2:
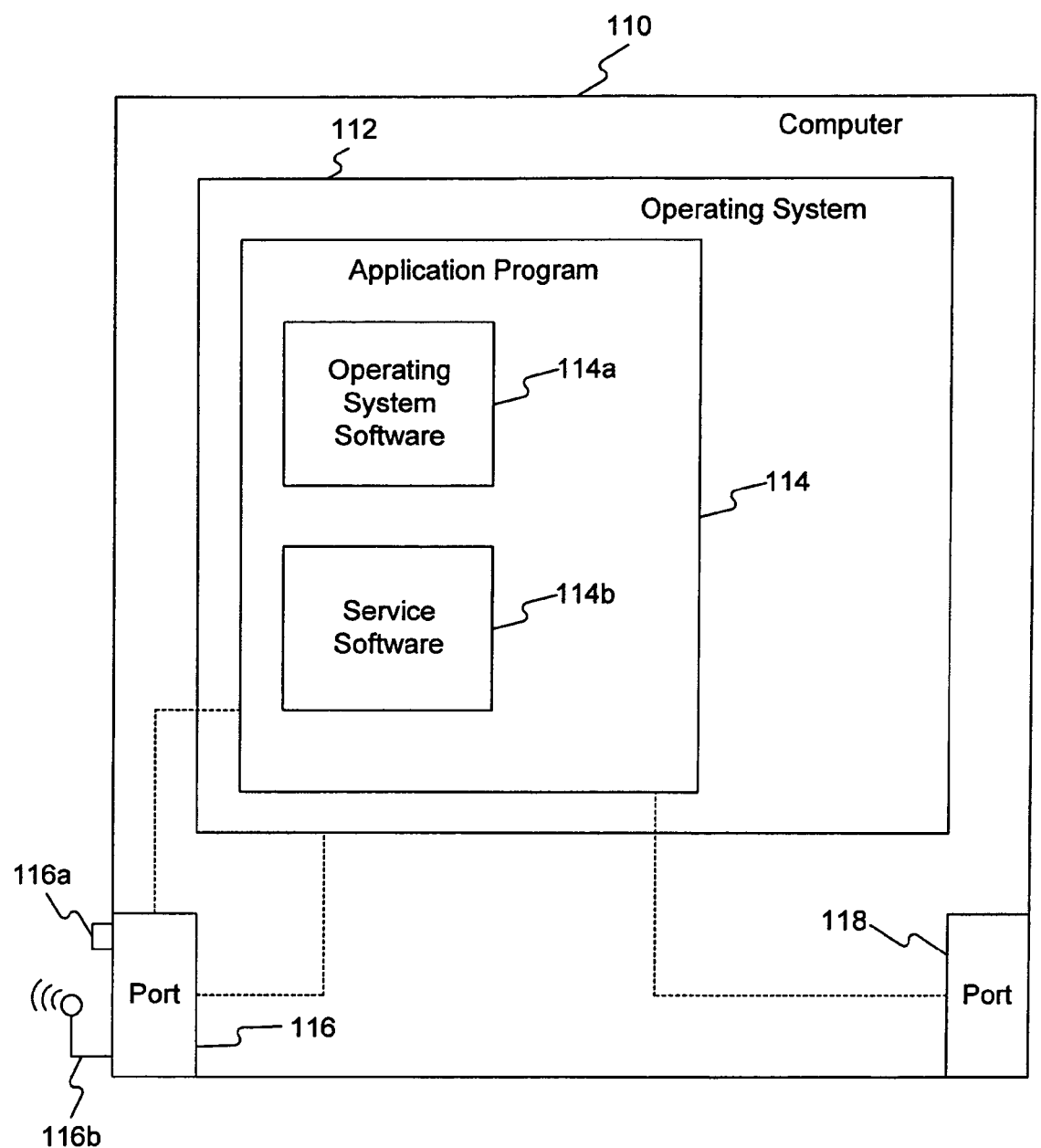
FIG. 2 illustrates an exemplary computer for implementing a service tool, consistent with certain disclosed embodiments.

In one embodiment, as shown in FIG. 2, computer 110 includes host operating system 112, service tool application program 114, communication port 116, and communication port 118. As described above, host operating system 112 handles the operation of computer hardware and hosts application programs which run on computer 110. In one embodiment, host operating system 112 is associated with a set of user-configurable control settings, such as network settings (e.g., network protocol, network interface information and selection, etc.), security settings (e.g., firewall settings, password protection, etc.), power save settings, etc. These settings may be changed or configured by a user or computer implemented process, and may be changed or configured based on the needs of certain application programs. For example, network and security settings may have one setting when connected to a user's home network (e.g., LAN, WAN, Intranet, etc.), may have a different setting when connected to a second network (e.g., LAN, WAN, Intranet, etc.), and may have a third setting when connected to a third network, such as a service network (e.g., service network 140).

Communication port 116 serves as an service interface between computer 110 and machine 130 or service network 140. Communication port 116 may include one or more standard hardware and/or software-based interfaces that permit computer 110 to communicate with machine 130 or service network 140. In one embodiment, communication port 116 may include, for example, a wireless interface 116b for communicating wirelessly with the service network 140, machine 130, and/or other networks or devices. Alternatively, or additionally, communication port 116 may include a wired interface 116a for communicating via a wired medium (e.g., CAN-1939 connector, fiber optic cable, T1 line, phone line, etc.). Communication port 116 may also serve as a network interface for communicating with home network 180, the Internet, or another external network. Alternatively, computer 110 may include a separate network interface for communicating with home network 180 or another external network.

Communication port 118 may include one or more standard hardware and/or software-based interfaces (e.g., USB port, CD or DVD tray, etc.) that permit computer 110 to communicate with an external storage device, such as removable storage 150. Communication ports 116 and 118 may be accessed by application programs running on operating system 112, including, for example, service tool application program 114.

Service tool application program 114 serves as a virtualized, self-contained service tool that permits a user to perform service-related tasks, such as diagnostics and maintenance, on machine 130. Service tool application program 114 includes its own operating system software 114a and service software 114b, which together permit service tool application program 114 to run on its own virtualized operating system platform and communicate with machine 130, service network 140, and removable storage 150, without the need to access the host operating system kernel. Thus, service tool application program 114, via operating system software 114a, may have, for example, its own bootstrap code, and may have settings (e.g., network settings, security settings, etc.) that are different from the host operating system settings. Operating system software 114a permits the service tool application program, when executed, to execute as an internal operating system platform separate from the existing operating system platform and configured with settings that permit the computer to communicate with one or more machines coupled to the computer. As such, a service technician need only know the settings and configurations of service tool application program 114 in order to use the program. A service technician need not have expertise in managing the settings and configurations of host operating system 112.

Service tool application program 114, via service software 114b, may include instructions that permit a user to run diagnostic evaluations of machine 130, control settings on software modules (e.g., engine control modules, exhaust control modules, etc.) on machine 130, and perform other services on machine 130. As such, service software 114b may comprise a service module configured to perform service-related tasks for one or more machines coupled to computer 130. Using operating system software 114a and service software 114b, a user may set or change the configuration settings of service tool application program 114 and may perform services on machine 130 without changing or affecting the settings of the host operating system (e.g., without changing networking or security settings of computer 10 associated with a home network).

Service tool application program 114 may be installed on computer 110 from a remote computer via electronic transmission (e.g., via a network such as the Internet), or may be installed from a portable storage device (e.g., flash memory via a USB connection, CD, DVD, etc.). In one embodiment, service tool application program 114 may be stored on a removable storage, such as removable storage 150, and may execute directly from the removable storage. In one embodiment, service tool application program 114 is a secured file, protected with digital encryption, a digital certificate, and/or password protection. Thus, when a new version of service tool application program 114 is installed on computer 110 or on removable storage 150, the service tool application program 114 may be associated with a digital certificate, and the user may be assigned a password.

In one embodiment, at certain times (e.g., each time the service tool application program 114 is invoked for use; after a previous period of time for which service tool application program 114 has been authorized for use expires; etc.) an authorization procedure is implemented in order to decrypt the program for use. For example, the program may be associated with a digital certificate provided to and/or stored on computer 110 and also stored on a remote authorization server, such as authorization server 170.

When the program must be decrypted for use, service tool application program 114 sends a digital key (e.g., private key, public key, and/or key pair) associated with its copy of the digital certificate in a request for service to authorization server 170 Authorization server 170 then uses the received digital key to determine whether the digital certificate stored on computer 110 is the same as the digital certificate stored on authentication server 170. If the digital certificates are the same, then authorization server 170 may send a decryption key to service tool application program 114. The decrypted program may then be used to perform service tasks on a connected machine.

In one embodiment, the digital certificate is also associated with a password for authorizing a user. The user must then additionally send the correct password to authorization server 170 in order for the service tool application program 114 to be properly decrypted. Authorization may be required every time the program is used, or may be required periodically. For example, after successful authorization, service tool application program 114 may be decrypted and may remain decrypted and available for use for a set period of time (e.g., one week, 30 days, etc.) before a subsequent authorization is necessary.

In one embodiment, authorization server 170 may store a table or other data structure that keeps track of computers in which service tool application program 114 is installed (e.g., based on an Ethernet address or other unique computer identifier), the version of the service tool application program 114 installed on each computer, a digital certificate for each installed copy of service tool application program 114, a password associated with the digital certificate for each copy of service tool application program 114, and whether a particular digital certificate has been revoked (e.g., is no longer valid). A digital certificate may be revoked, for example, if it is determined that the version of the service tool application program 114 installed on a computer has been installed illegally (e.g., without proper copyright permission), if the version has been determined to be corrupted or is no longer the most recent version, if a user's time limit for use is expired, etc. An authorization table on authorization server 170 storing such information may, include, for example, the following type of information:

| Computer ID | Program/Version Installed | Digital Certificate | Password | Digital Certificate Valid? |
|---|---|---|---|---|
| Computer 1 | ABC 1.1 | Certificate 1 | Password 1 | yes |
| Computer 2 | ABC 1.1 | Certificate 2 | Password 2 | yes |
| Computer 3 | ABC 1.0 | Certificate 3 | Password 3 | no |
| Computer 3 | ABC 1.1 | Certificate 4 | Password 4 | yes |
| Computer 4 | ABC 1.1 | Certificate 5 | Password 5 | no |
| ... | ... | ... | ... | ... |

In the example above, the authorization table indicates that Computer 1 has version 1.1 of service tool application program ABC installed, and has been issued Certificate 1 and Password 1. Upon invocation, if Computer 1 sends a digital key for Certificate 1 and Password 1 to authorization server 170, Version 1.1 of the program installed at Computer 1 will be determined to be authorized (e.g., by comparing Certificate 1, as determined using the digital key, and Password 1 to the certificate and password information stored in the authorization table), and will be sent a decryption key for decrypting version 1.1 of program ABC for use. Likewise, if Computer 2 sends a digital key for Certificate 2 and Password 2 to authorization server 170, Version 1.1 of program ABC installed at Computer 2 will be determined to be authorized, and will be sent a decryption key for decrypting the program for use. However, if Computer 2 were to send an incorrect password or incorrect digital key to authorization server 170 (e.g., one that does not indicate matching stored authorization information), then Computer 2 would be denied access to Version 1.1 of program ABC, and the program would not be decrypted for use. In continuing this example, if Computer 3 were to send a digital key for Certificate 3 and Password 3 to authorization server 170, Computer 3 would not be given access to Version 1.0 of program ABC because access to this version for Computer 3 has been revoked. For example, access may have been revoked because the Version 1.0 is no longer valid or is corrupted. On the other hand, if Computer 3 were to send Certificate 4 and Password 4 to authorization server 170, Computer 3 would be given access to Version 1.1 of program ABC. This same authorization process may be used for Computer 4, and any other computers that attempt to use a service tool application program.

In one embodiment, a computer that is not in the authorization table or that includes a digital certificate that does not match the certificate stored in the authorization table may be denied access to use the service tool application program 114. For example, Computer 1 may have a valid copy of Version 1.1 of program ABC and a legitimate digital certificate (e.g., Certificate 1). A user may copy program ABC from Computer 1 to another computer (e.g., Computer X) that is not authorized to use the application. When a digital key for Certificate 1 is later sent to authorization server 170 from Computer X, authorization server 170 will not find any valid certificate associated with Computer X, and so Computer X will not be able to decrypt and use the service tool application program. In response, the authorization server 170 may, for example, send a message to service tool application program 114 at Computer X indicating that the user does not have authorization rights, or more generally that there is a system problem.

Although a table storing computer IDs and program/version installed is depicted above, the computer ID and version number are optional, and are not necessary in order to check for authorization. In this sense, a digital certificate may represent a user. In one embodiment, for example, an authorization table may include only a digital certificate, an optional password, a program indicator, and an indicator of whether the digital certificate is valid. In this embodiment, an authorization server need only check whether a submitted digital key for a digital certificate for the requested program matches a stored digital certificate for that program and has not been revoked. If a valid matching digital certificate is found, then access to the program may be granted. In this embodiment, the digital certificate may be stored in the same storage device as the service tool application program (e.g., computer storage system, removable storage device, etc.). Accordingly, access to the program may be granted or revoked regardless of the computer or storage device on which the program is stored—if the requesting program has a valid digital certificate, it is decrypted and may be used to perform services on machine 130.

In one embodiment, authorization server 170 may additionally or alternatively store a separate table that includes version authorization rights. For example, if a version of the service tool application program 114 is no longer valid or should no longer be used, authorization server 170 may store information indicating that access to that version, for any computer having any digital certificate, should be denied. Thus, any user attempting to use that version of the program will not be able to do so. Further, if a new version of service tool application program 114 is available, authorization server 170 may be configured to send a message to service tool application program 114 indicating that the new version may be downloaded or otherwise sent to the program. Furthermore, if software patches are available for the existing version of the program, a message indicating the availability of the software patches may be sent to service tool application program 114. Patches may be needed, for example, based on software problems or based on the equipment being serviced.

The host operating system 112, service tool application program 114, and other software applications and utilities may be stored on one or more computer readable media storage devices on computer 110. Alternatively, in one embodiment, service tool application program 114 may not be installed directly on computer 110, but may be stored on a computer readable medium such as removable storage 150 (e.g., a USB flash memory storage device, CD, DVD, etc.). In this case, because the program is self-contained, it can be executed entirely from the removable storage 150, without the opportunity to corrupt other files on computer 110. In one embodiment, data received from machine 130 as a result of diagnosis may be stored on a dedicated storage on computer 110 (e.g., hard drive). In another embodiment, where removable storage 150 is writeable memory (e.g., USB flash memory, re-writeable CD or DVD, etc.), data retrieved from diagnosis of machine 130 may be stored on the removable storage 150.

Figure 3:
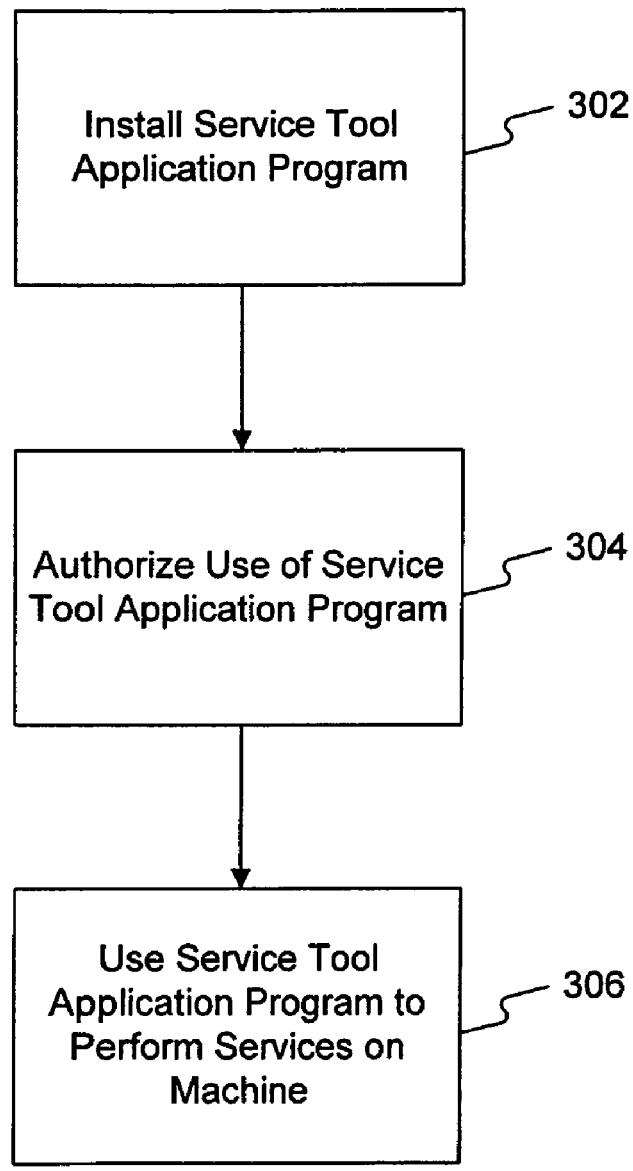
FIG. 3 illustrates an exemplary method consistent with certain disclosed embodiments.

FIG. 3 is a flow chart illustrating an exemplary method 300 of using service tool application program 114, according to one embodiment. In step 302, a service tool application program is installed, for example, on a computer, such as computer 110, or on a removable storage device such as removable storage 150. The service tool application program may be installed, for example, from a remote computer via electronic transmission (e.g., via a network such as the Internet), or from a portable storage device (e.g., flash memory via a USB connection, CD, DVD, etc.). In one embodiment, the service tool application program is installed in a computer running an existing operating system platform, such as operating system 112, and includes operating system software and service application software.

The operating system software may include its own configuration settings and bootstrap code independently of the settings and bootstrap code of the host computer's existing operating system. As a result, the operating system software includes configuration code that permits the service tool application program to communicate with a remote machine, such as machine 130, without changing the communication settings of the existing host operating system.

The service software also may include code for performing services on a machine, such as machine 130. For example, in one embodiment, service application software includes diagnostic and/or maintenance code that permits the service tool application program to run diagnostic and/or maintenance tasks for diagnosing and/or maintaining a remote machine. Although the operating system software and service software are described above as separate entities, they may be separate sets of software code instructions, or may be integrated as a single set of software code instructions.

In one embodiment, the service tool application program is a secured file, protected with digital encryption, a digital certificate, and/or password protection. In this embodiment, in step 304, an authorization step for the use of the service tool application program is performed. For example, when service tool application program is opened, the program may check to see if a previous authorization period is expired. For example, if a previous authorization period of 30 days has been set, and only 20 days have passed since authorization, then service tool application remains authorized, and may be used without any further steps. However, if the authorization period is expired, or if it is required upon every invocation of the service tool application program, then in one embodiment, a digital key for a digital certificate stored on the computer (e.g., computer 110) and associated with the version of the program being used is sent to an authorization server, such as authorization server 170. Additionally, a password associated with the digital certificate may be entered by a user and may also be sent to the authorization server. In one embodiment, the authorization server then checks that the digital certificate corresponds to a matching digital certificate stored on the authorization server and is not revoked, and checks that the password is correct. If both the digital certificate and password are valid, then the authorization server sends a decryption key to the computer to decrypt the service tool application program for use in performing service tasks.

If the service tool application program is authorized and decrypted for use, then in step 306, it may be used to perform services for the machine or machines to which it is connected. For example, if the program is connected through a port on computer 110 either directly to a machine 130 or indirectly to one or more machines through to a service network, the service tool application program may be used to diagnose one or more parts of the machine or machines and to perform maintenance on one or more parts of the machine or machines. In one embodiment, some of the diagnostic or maintenance tasks may be directed by a user, and others may be controlled by automatic software processes.

Throughout installation step 302, authorization step 304, and use step 306, computer 110, removable storage 150 and/or authorization server 170 may maintain a log of events that occur in connection with the invocation and use of the service tool application program. For example, the log may keep a record of each time a user invokes the service tool application program; each time the user submits a digital key for a digital certificate and/or a password to authorization server 170; each time the digital certificate and/or password is valid; each time the digital certificate is incorrect or has been revoked, including a log of the incorrect/revoked submitted certificate; diagnostic tasks performed on the machine; maintenance tasks performed on the machine; etc.

Figure 4:
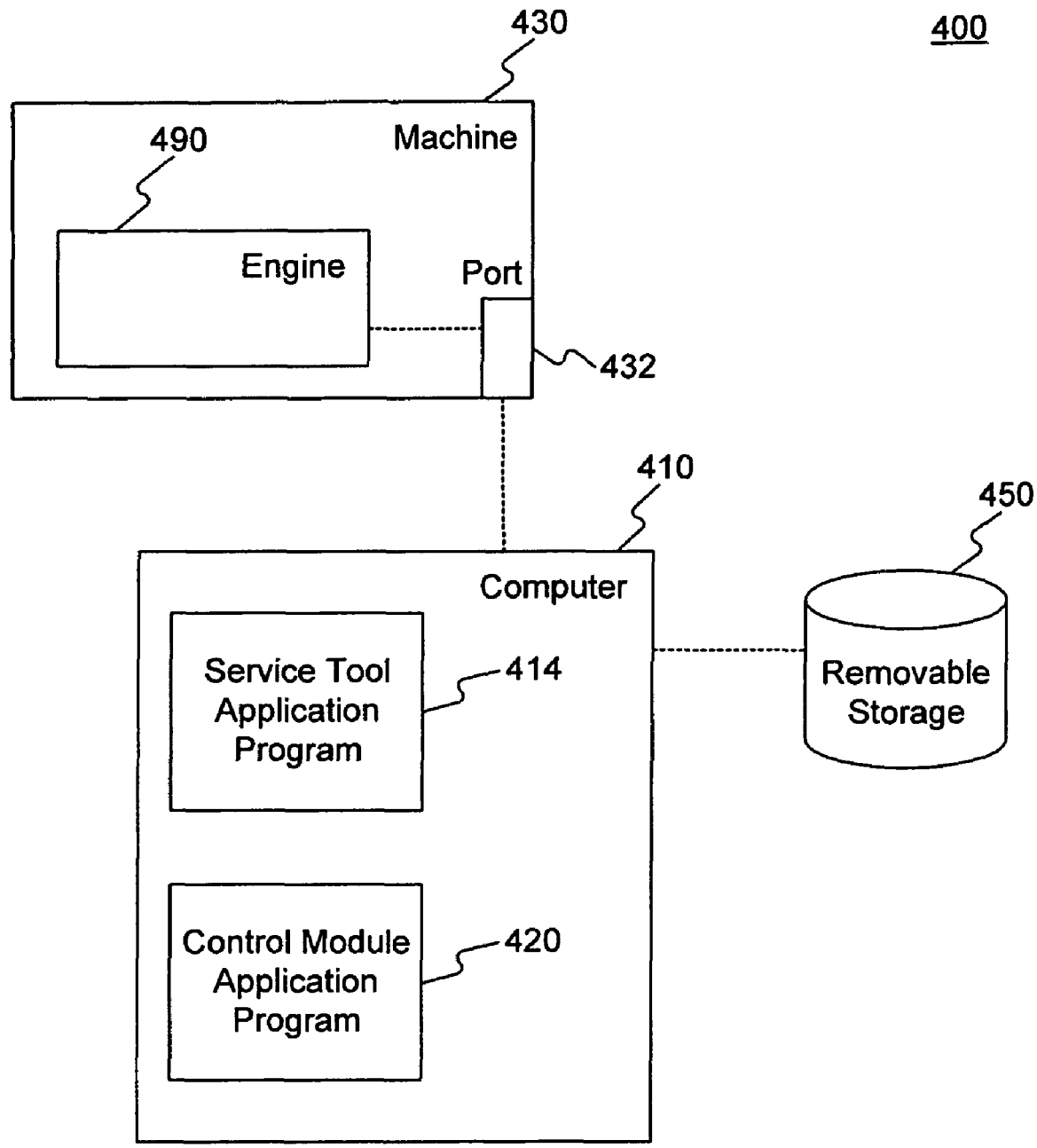
FIG. 4 illustrates an exemplary system for implementing a service tool and control module, consistent with certain disclosed embodiments.

In addition to the virtualized service tool described above, in one embodiment, a virtualized control tool may be used to control equipment on machines. For example, machines often employ control modules associated with the machines' parts (e.g., engine control unit; transmission control system, etc.). The control modules often reside on the machine and are embedded as firmware on the machine. As shown in FIG. 4, an embodiment of a virtualized control module disclosed herein removes or reduces the need to include embedded firmware in the machine by maintaining a virtualized control module on a computer 410 and/or removable storage 450. In addition, by including a virtualized control module on computer 410 and/or removable storage 450, certain diagnostics and maintenance tasks may be performed entirely using the computer 410 and removable storage 450, without the need to access the actual machine or controlled device.

FIG. 4 depicts a system 400 including a machine 430 including engine 490 and port 432, and a computer 410 including service tool application program 414, similar to program 114 discussed above, and also control module application program 420. System 400 may also include removable storage 450. Both service tool application program 414 and control module application program 420 may be virtualized application programs running their own operating system platform (or a combined operating system platform between the two) and protected with encryption, digital certificate technology, and password protection. For example, control module application program 420 may have its own operating system software and control software. In this way, a portion or all of the control systems for a machine may be stored on a single computer, protected with security measures that render the machine unusable except by authorized users whose rights have not been revoked.

In one embodiment, a computer and/or removable storage device, such as computer 410 and/or removable storage device 450 may be dedicated to machine services and control, and thus may be equipped only with the application programs necessary to perform services and control of the machine. In one embodiment, a machine services and control program suite of programs may be stored on a removable storage device 450 such as a USB enabled flash memory, or other small memory device that may be easily carried by a user (e.g., on a key chain). The removable storage device 450 can be connected to a services and control computer installed on machine 430 (e.g., a computer console with a keyboard, screen, and other user interface components) in order to permit operation of the machine, thus serving as an electronic key permitting control of the machine.

INDUSTRIAL APPLICABILITY

The disclosed embodiments may be used to perform diagnosis, maintenance, and/or control of machines and machine parts. The machines may be vehicles, such as automobiles, trucks, earth-moving equipment, etc., or may be other equipment. For example, in one embodiment, the machine may be a vehicle having an engine that uses an engine control unit (ECU) for controlling engine behavior. The ECU may keep a log of activity for the engine, may include software and/or firmware that includes instructions for controlling engine characteristics (e.g., power output, fuel and air intake, etc.), and may include additional configuration settings for the engine. To diagnose and/or maintain the engine, the service tool application program disclosed herein may read and analyze the activity log, reset software or firmware on the ECU to change engine characteristics (e.g., increase maximum power output, etc.), check and/or change the configuration state of the engine, install new software and/or hardware patches in the ECU (e.g., security patches), or perform other tasks.

In addition, in certain embodiments, the ECU or other control modules may be implemented as virtualized control module application programs on a computer. These modules may be used to control aspects of the machine's performance, such as the engine characteristics described above. Furthermore, these modules may be serviced by the service tool application program. Thus, for example, a virtualized ECU may be reset to change engine characteristics through the use of a virtualized service tool application program for diagnosing and maintaining an engine. In one embodiment, the virtualized ECU may be reset without accessing the machine, because both the virtualized ECU and the virtualized service tool application program may be stored on the same computer or storage device.

Although the example of an engine and ECU is described above, the disclosed service tool application program and control module application program may be used for any machine or part or system of a machine that can be diagnosed, maintained, and/or controlled using a computer.

Furthermore, the computers 110 and 410 described herein may be any computer capable of executing the disclosed application programs. For example, the computer may be a laptop or desktop computer running a standard operating system, such as Microsoft Windows™, Mac OS™, Linux™, etc. The computer may also be a palm-sized computer and/or cell phone (e.g., Blackberry™, IPhone™, etc.). In one embodiment, computer 110 or 410 may be a simplified device configured with the software and hardware necessary to carry out the methods described herein, and only minimal additional software or hardware. For example, computer 110 or 410 may include one or more service tool or control module application programs for performing one or more types of services or controls on machines, and may include additional software such as a word processing program, spreadsheet program, calculator tools, etc., but may not include an Internet browser, e-mail capabilities, or other features that could increase the likelihood of downloading a virus or being subject to malicious attacks.

It will be apparent to those skilled in the art that various modifications and variations can be made to the disclosed virtualized service tool and virtualized control module. Other embodiments will be apparent to those skilled in the art from consideration of the specification and practice of the disclosed service tool and control module application programs. It is intended that the specification and examples be considered as exemplary only, with a true scope being indicated by the following claims and their equivalents.

What is claimed is:

1. A computer-readable medium storing a virtualized service tool application program for running on a computer running an existing operating system platform, the virtualized service tool application program comprising:

operating system software configured to execute as an internal operating system platform separate from the existing operating system platform, and that is configured with settings that permit the computer to communicate with one or more machines coupled to the computer; and a service module configured to perform service related tasks for the one or more machines coupled to the computer.

2. The computer-readable medium of claim 1, wherein:
the virtualized service tool application program is encrypted;
the virtualized service tool application program is associated with stored authorization information; and
the virtualized service tool application program can only be decrypted and executed if authorization information is provided that matches the stored authorization information.

3. The computer-readable medium of claim 2, wherein:
the virtualized service tool application program can only be decrypted and executed if authorization information is provided that matches the stored authorization information, and if the stored authorization information is valid.

4. The computer-readable medium of claim 1, wherein:
the computer-readable medium is a removable storage device configured to be connected to the computer; and
the virtualized service tool application program is configured to execute from the removable storage device.

5. The computer-readable medium of claim 4, wherein:
the removable storage device is configured to store data resulting from a diagnosis of the machine performed by the virtualized service tool application program.

6. The computer-readable medium of claim 4, wherein:
the removable storage device is configured to store a log of events that occur in connection with the invocation and use of the virtualized service tool application program.

7. The computer-readable medium of claim 1, wherein:
the computer-readable medium is a storage system on the computer; and
the virtualized service tool application program is not authorized for use.

8. A method of diagnosing one or more machines, the method comprising:
providing a service tool application program at a computer running an existing operating system platform, the service tool application program comprising:
a configuration code portion that permits the service tool application program to communicate with a remote machine without changing the communication settings of the existing operating system, and
a diagnostic application code portion that permits the service tool application program to run diagnostic tasks for diagnosing the remote machine;
executing the service tool application program; and
performing diagnostic tasks on the remote machine using the service tool application program.

9. The method of claim 8, further including:
storing authorization information at an authorization server system; and
permitting the service tool application program to be used for diagnostic tasks if the stored authorization information matches authorization information stored on the computer.

10. The method of claim 9, further including:
permitting the service tool application program to be used for diagnostic tasks if the stored authorization information matches authorization information stored on the computer, and if the authorization information is indicated as being valid.

11. The method of claim 9, further including:
preventing the service tool application program from being used if authorization to use the particular version of the service tool application program provided at the computer has been revoked.

12. The method of claim 8, wherein executing the service tool application program further includes:
executing the service tool application program from a removable storage device being accessed by the computer.

13. The method of claim 12, further including:
storing, in the removable storage device, data resulting from a diagnosis of the machine performed by service tool application program.

14. The method of claim 12, further including:
storing, in the removable storage device, a log of events that occur in connection with the invocation and use of the service tool application program.

15. The method of claim 8, wherein providing the service tool application program at the computer further comprises:
installing the service tool application program in a storage system on the computer.

16. The method of claim 8, wherein providing the service tool application program at the computer further comprises:
accessing a removable storage device by the computer, the removable storage device storing the service tool application program.

17. A computer-readable medium storing a virtualized control module application program for running on a computer running an existing operating system platform, the virtualized control module application program comprising:
operating system software to execute as an internal operating system platform separate from the existing operating system platform, and that is configured with settings that permit the computer readable medium to execute the virtualized control module application program and to communicate with a machine coupled to the computer readable medium via a communication interface; and
control software configured to control a part of the machine.

18. The computer-readable medium of claim 17, wherein:
the computer-readable medium is a removable storage device configured to execute the operating system software and control software.

19. The computer-readable medium of claim 17, wherein:
the virtualized control module application program is encrypted.

20. The computer-readable medium of claim 17, wherein the computer-readable medium further stores a virtualized service tool application program configured to perform services on the control software.

* * * * *